United States Patent
Bucklew et al.

(10) Patent No.: US 7,814,460 B2
(45) Date of Patent: Oct. 12, 2010

(54) HIERARCHICAL MODULAR SOFTWARE PACKAGES AND ASSOCIATED DEVELOPMENT TOOL

(75) Inventors: Charles B. Bucklew, Sunrise, FL (US); Michael Hak, Coral Springs, FL (US)

(73) Assignee: Scriptlogic Corporation, Boca Raton, FL (US)

( * ) Notice: Subject to any disclaimer, the term of this patent is extended or adjusted under 35 U.S.C. 154(b) by 1097 days.

(21) Appl. No.: 11/457,228

(22) Filed: Jul. 13, 2006

(65) Prior Publication Data

US 2008/0016505 A1 Jan. 17, 2008

(51) Int. Cl.
  *G06F 9/44* (2006.01)
(52) U.S. Cl. .................. 717/109; 717/105; 717/106; 717/125
(58) Field of Classification Search ......... 717/100–103, 717/104–109, 120, 113, 125; 709/203, 223
See application file for complete search history.

(56) References Cited

U.S. PATENT DOCUMENTS

| | | | |
|---|---|---|---|
| 2004/0015833 A1* | 1/2004 | Dellarocas et al. | 717/106 |
| 2004/0148370 A1* | 7/2004 | Sadiq | 709/223 |
| 2004/0148588 A1* | 7/2004 | Sadiq | 717/109 |
| 2006/0010195 A1* | 1/2006 | Mamou et al. | 709/203 |
| 2006/0150148 A1* | 7/2006 | Beckett et al. | 717/109 |
| 2006/0206856 A1* | 9/2006 | Breeden et al. | 717/101 |

OTHER PUBLICATIONS

Ganci et al. "Rational Application Developer V6 Programming Guide", Jun. 2, 2005, IBM Redbooks, pp. 4, 222-224, 503-524, 1043-1044, 1087-1116, and 1218-1224.*
Kovari, et al., "WebSphere Application Server Enterprise V5 and Programming Model Extensions SebSphere Handbook Series," Sep. 2003, IBM Redbooks, Chapter 4, section 2-4.*

* cited by examiner

*Primary Examiner*—Wei Y Zhen
*Assistant Examiner*—Chung Cheng
(74) *Attorney, Agent, or Firm*—Jeffrey N. Giunta; Fleit Gibbons Gutman Bongini & Bianco P.L.

(57) ABSTRACT

A hierarchical modular software development tool provides a graphical user interface to allow development of hierarchical module software components. The software development tool allows graphical creation of a software component processing hierarchy and then generates a software component using this specified processing hierarchy. The packages developed using this tool are able to include event modules that allow sub-branches of the software component processing hierarchy to be executed without requiring processing of modules of the software component hierarchy that precede the event nodes. Further nodes that are able to be included in the processing hierarchy include action nodes, that contain operational software, and conditional nodes that allow condition testing and conditional execution of processing branches.

15 Claims, 9 Drawing Sheets

HIERARCHICAL MODULAR SOFTWARE PACKAGES AND ASSOCIATED DEVELOPMENT TOOL

BACKGROUND OF THE INVENTION

1. Field of the Invention

This invention generally relates to software packages and software development tools for said software packages, and more specifically to software packages and software development tools for modular software packages to be distributed to multiple computing systems.

2. Description of Related Art

Modular software development using graphical user interface based development tools allows a software developer to more easily, and therefore more quickly and cost effectively, develop software components for use in various applications. A hierarchical software component design allows a software developer, as well as subsequent software maintainers, to quickly understand the current processing performed by the software component and make changes or additions to the software component as required.

Hierarchical software components are generally defined as software processing threads that allow processing to be defined from the start of a thread to the end of a thread. This limits the flexibility of software components where only a part of a particular processing thread is desired to be executed in response to, for example, a particular event. Redesign of the software component is often required to allow the further subdivision of a modular processing thread into sub-components that can be executed as required. This redesign is time consuming and may yield unforeseen results or at least allow the introduction of design errors into the software component.

Therefore a need exists to overcome the problems with the prior art as discussed above.

SUMMARY OF THE INVENTION

In accordance with one embodiment of the present invention, a computer implemented method for developing a modular software component includes providing a graphical user interface adapted to accept operator inputs and defining, through the graphical user interface, a hierarchical representation for at least one software component. Each of the at least one software component includes a selected software module, at least one child execution module, and a parent software module. The selected software module is a child of the parent software module and a parent of the at least one child execution module. The method further includes associating, through the graphical user interface, the selected software module with an event external to the software component. The method also includes creating the software package defined by the hierarchical representation. The selected software module is adapted to initiate, independently of execution of the parent software module and in response to the external event, execution of the at least one child execution module.

In accordance with another aspect of the present invention, a software development system that is adapted to developing a modular software component includes a graphical user interface that is adapted to accept operator inputs and define a hierarchical representation for at least one software component. The at least one software component each comprising a selected software module, at least one child execution module, and a parent software module. The selected software module is a child of the parent software module and a parent of the at least one child execution module. The software development system further includes an event manager adapted to associating, through the graphical user interface, the selected software module with an event external to the software component. The software development system further includes a software component generator adapted to creating the software package defined by the hierarchical representation. The selected software module is adapted to initiate, independently of execution of the parent software module and in response to the external event, execution of the at least one child execution module.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter that is regarded as the invention is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

In accordance with one embodiment of the present invention, a graphical user interface allows a software developer to use a graphical user interface to develop software components, such as software agents, by arranging modular nodes into a software component hierarchy. The software component hierarchy is able to include "event nodes" at arbitrary locations that act as entry points into the software component hierarchy. These event nodes indicate that processing of their children nodes within the software component hierarchy are to be triggered in response to an occurrence of an event associated with that event node. A software component that corresponds to the defined software component hierarchy is then generated and distributed to one or more computer workstations. This embodiment of the present invention allows a software developer to use a graphical user interface to define and generate a modular and hierarchical software component that is able to flexibly execute only a portion of the software component without requiring execution of the entire software component from its initial entry point.

The software component hierarchy is defined by arranging a number of nodes on a graphical user interface. Each of these nodes has an associated software module that is the actual software code represented by the node. These nodes and their associated modules are assembled into the complete software component, such as a workstation configuration agent, that is generated by the software development system and deployed to one or more workstations.

Figure 1:
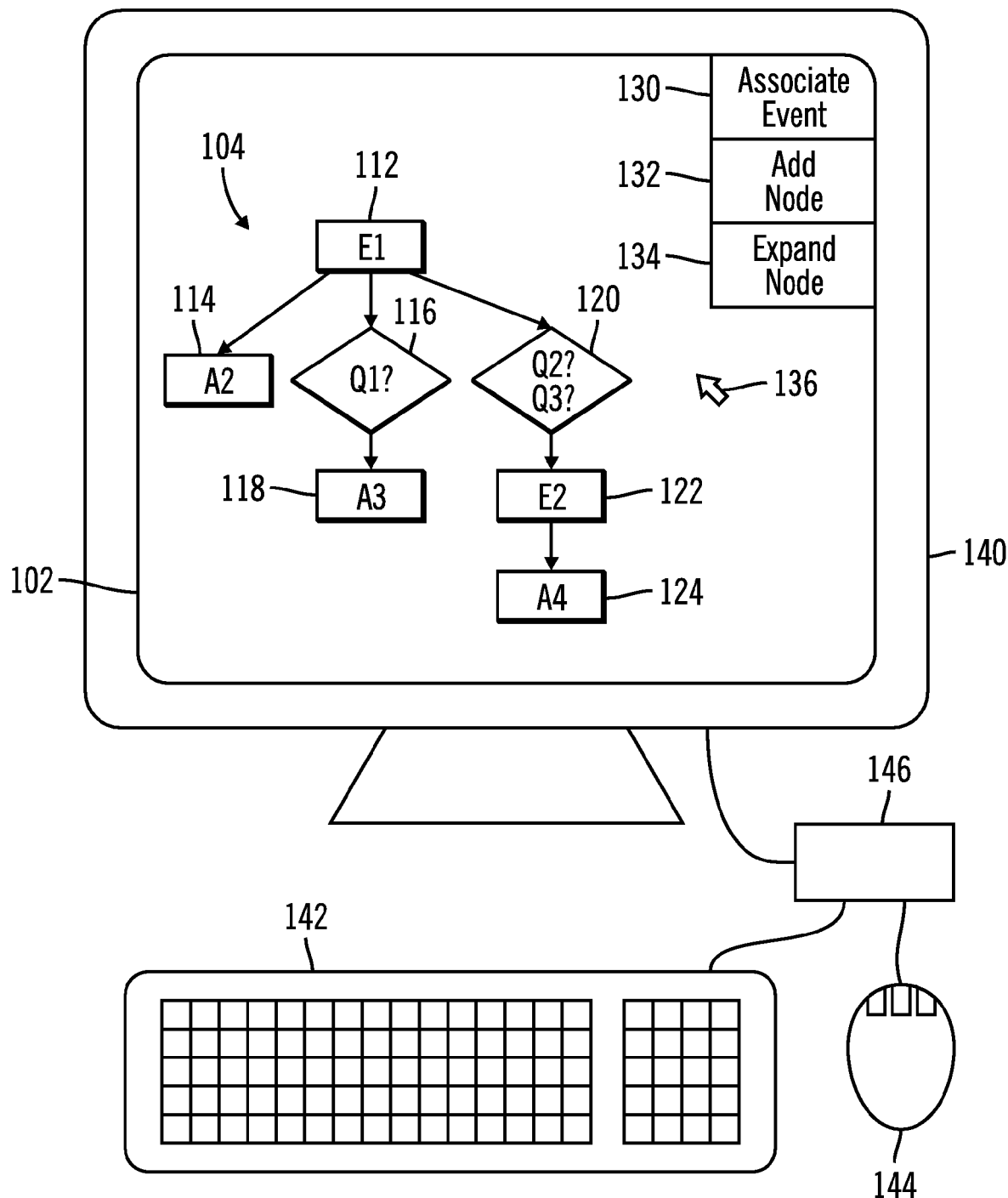
FIG. 1 illustrates a graphical user interface of a software development system along with a defined software component hierarchy defined thereby, in accordance with an exemplary embodiment of the present invention.

Referring now in more detail to the drawings in which like numerals refer to like parts throughout several views, FIG. 1 illustrates a graphical user interface 102 of a software development system 100 along with a defined software component hierarchy 104 defined thereby, in accordance with an exemplary embodiment of the present invention. The graphical user interface 102 is generated by a software development computer workstation 146 and is displayed on a monitor 140. The software development computer workstation 146 of one embodiment of the present invention includes a keyboard 142 and a mouse 144 that are adapted to provide user inputs to the graphical user interface 102.

The illustrated graphical user interface 102 displays a software component hierarchy 104. The software component hierarchy 104 provides a graphical illustration of the processing interconnections between various software modules within the depicted software component. The exemplary software development system supports defining software components that consist of multiple software module types.

A software developer using the exemplary software development system 100 is able to define a software component hierarchy 104 by constructing, modifying, and/or otherwise maintaining the software component hierarchy 104 through the use of the graphical user interface 102 and the exemplary software development system 100. A software developer defines a software component hierarchy 104 by defining a number of nodes that correspond to software modules and then arranging those nodes, and thereby arranging their associated software modules, into a hierarchical structure. The software component hierarchical structure then defines a hierarchical, modular software component. Once a software component hierarchy 104 is defined, the software component defined by that software component hierarchy 104 is generated and is able to be distributed to one or more computer workstations for execution on each of those computer workstations.

A software developer using the of the software development system 100 is able to select software modules for inclusion into a software component hierarchy 104 by choosing from either basic software modules that are pre-configured into the software development system or the software developer is able to also choose from custom software module that have been created by combining basic software modules into custom processing modules that are represented by a custom node on the graphical user interface. The software developer is also able to select modules that are created by other development systems or techniques, including modules written in another programming language written, when those modules are written to conform to a specified module interface.

The basic software modules that are pre-configured into a software development system 100 include event modules, action modules, condition modules and combination modules. The event modules, action modules and condition modules are able to be combined into more complex modules through the use of combination modules.

Event modules of one embodiment of the present invention are able to be associated with one or more events by an event manager that is part of the software development system 100, such as through the graphical user interface 102. The event modules are able to be associated with events that are external to the generated software component. Each event in one embodiment of the present invention is associated with parameters that define the event and conditions that will trigger an event module within a generated software component. Examples of events include a computer user's logging into or out of the computer system that is executing the generated software component. Event modules are processing entry points into the software module. When an event occurs, the software modules that are children to the event module associated with the occurred event are performed without requiring parent modules of that event module to be performed.

Action modules are modules that include operational software used to perform a pre-configured or software developer defined function. Action modules have a set of parameters that are passed to the operational software code associated with the action module in order to support the operational code's specified execution.

Condition modules of the exemplary embodiment are able to be configured to evaluate a software developer specified condition and either terminate execution of the hierarchical branch or continue execution of the hierarchical branch in response to the evaluation of the condition. Condition modules map a set of parameters to a condition handling software component.

Combination modules allow grouping of other modules into more complex processing blocks. Combination modules in one embodiment of the present invention include condition group and event groups. Condition groups are hierarchical processing nodes that include, in addition to the above described processing hierarchy children, an additional branch specifying one or more conditions that are required to be satisfied in order for the condition group to evaluate as "true" and allow processing to advance to the children within the processing hierarchy. Event groups combine a number of event nodes into a single node for inclusion into a software component hierarchy 104, thereby providing, for example, higher levels of abstraction in defining software component processing. These combination modules allow a software component developer to create software developer defined software modules for inclusion into a software component hierarchy, and ultimately into the generated software component.

The graphical user interface display 102 of one embodiment of the present invention includes a number of user command buttons, such as an "associate event" button 130, an "add module" button 132 and an "expand module" button 134. The graphical user interface display 102 includes a pointer 136, controlled by the movement of mouse 144, that allows a software developer to select or activate graphical elements, such as selecting a node representing a software module or activating a user command button.

The illustrated exemplary software component hierarchy 104 shows several types of software module types and their arrangement to define a software component that performs initialization processing and other processing that will control and/or alter a configuration of the computer workstation executing the software component. The exemplary software component hierarchy 104 begins with an "E1" node 112. The "E1" node of this example indicates a first event node. The E1 node 112 is able to be associated with a particular event that occurs in the computer workstation executing the software component defined by the exemplary software component hierarchy 104. For example, when a user logs into the computer workstation, the "E1" node is "triggered" and children software modules, which are represented by the nodes within the exemplary software component hierarchy 104 that are below the "E1" node, are then executed.

The children software modules of the "E1" node in this example are executed in response to the occurrence of an event that is associated with the "E1" node 112. After encountering the "E1" node 112, all of the children nodes of the "E1" node 112 are executed. The processing of the software component will execute a software module represented by the "A2" node 114, which is a second action node representing operation software that performs a software developer defined function. The processing of the software component proceeds by executing a software module represented by the first node of a "sibling" hierarchical processing branch of the exemplary software component hierarchy 104. In the illustrated exemplary software component hierarchy 104, the next sibling module is a conditional module, a "Q1?" module. The "Q1?" module evaluates a software developer defined condition "Q1" and either halts execution of its hierarchical processing branch or continues with processing of its children modules. If the condition "Q1" is false, the processing of this hierarchical branch stops and processing is started on the next sibling hierarchical branch, which begins with the "Q2? Q3?" conditional module 120 in this example. If the condition "Q1" is true, the processing of the software component defined by the exemplary software component hierarchy 104 continues by executing an "A3" action node, which represents software developer defined action "A3" in this example. After execution of the "A3" action node, which occurs if the "Q1" condition is true, the software component defined by the exemplary software component hierarchy 104 begins processing of the sibling hierarchical branch, which starts with the "Q2? Q3?" conditional module 120.

The "Q2? Q3?" conditional module 120 of this example is a compound conditional module that tests the value of two conditions, condition "Q2" and condition "Q3." If both of these conditions are true, the children of the compound conditional module are executed. If either of these conditions is not true, the children of this module are not executed. Compound conditional modules of this embodiment are able to have nested modules that are able to contain their own set or sets of conditions. Compound conditional modules themselves have a true internal hierarchy of conditions defined by conditional modules.

In the exemplary software component hierarchy 104, there are no further sibling hierarchical branch beyond the branch containing the "Q2? Q3?" conditional module 120, so the processing of this software component would terminate if either of the "Q2" or the "Q3" conditions were not true. If further siblings were present, the processing of the next sibling would commence in the case of either "Q2" or Q3" being false.

If conditions "Q2" and "Q3" are both true, the children modules of the "Q2? Q3?" conditional module 120 are executed. In the exemplary software component hierarchy 104, the "Q2? Q3?" conditional module 120 is followed by an event module, an "E2" module 122. The "E2" module 122 in this example is an event module that has been associated with the "E2" event. The processing of children of the "E2" module 122 is performed under two scenarios. One scenario is the passing of control as a result of programmatic flow through the parent node of the "E2" module 122, i.e., the "Q2? Q3?" conditional module 120. In that scenario, no event is required to proceed past the "E2" node 122. The other scenario consists of the execution of children of the "E2" module 122 in response to the "E2" event. After encountering the "E2" module 122, either as processing is passed from the "Q2? Q3?" conditional module 120 or in response to an occurrence of the "E2" event, the processing of the exemplary software component hierarchy 104 proceeds by executing the "A4" module 124, which is an action module that represents an operational software module that performs software developer defined action "A4." The processing of the software component represented by the exemplary software component hierarchy 104 then terminates.

Figure 2:
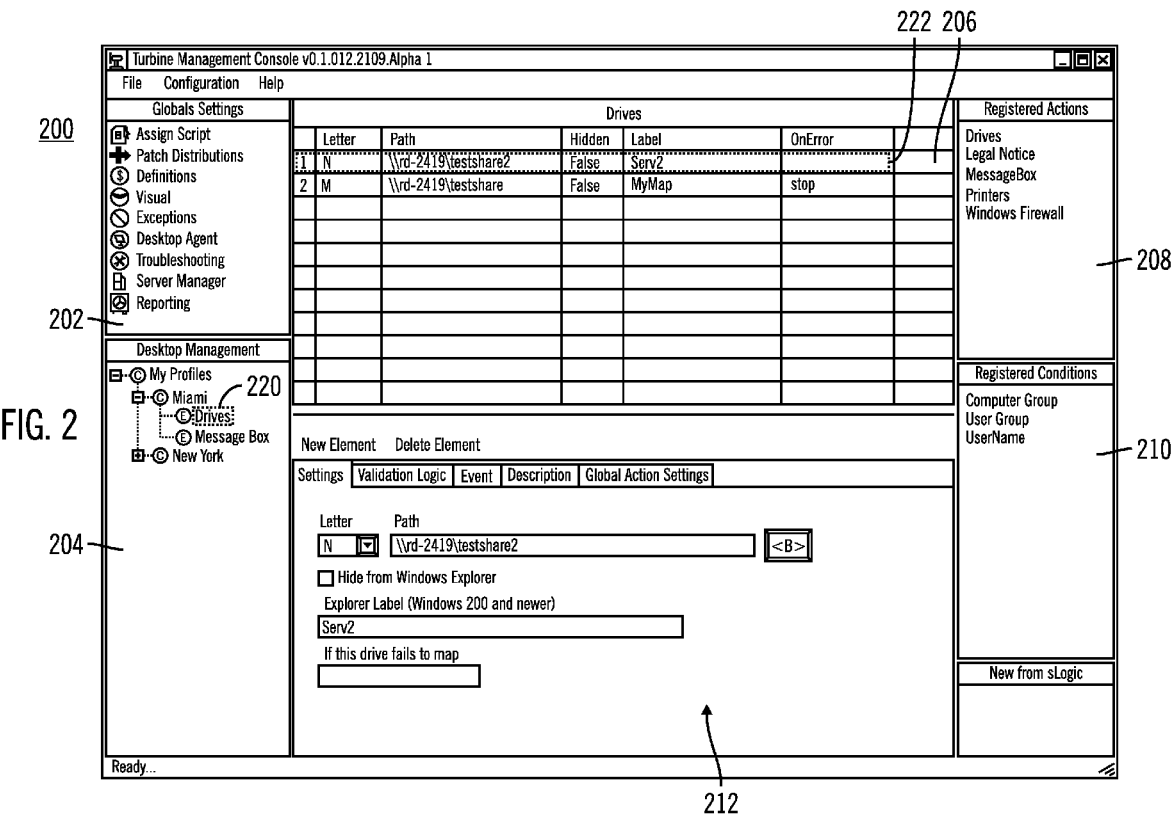
FIG. 2 illustrates a software component configuration window able to be displayed on the graphical user interface illustrated in FIG. 1, in accordance with an exemplary embodiment of the present invention.

FIG. 2 illustrates a software component configuration window 200 able to be displayed on the graphical user interface 102 illustrated in FIG. 1, in accordance with an exemplary embodiment of the present invention. The software component configuration window 200 of one embodiment of the present invention includes several display areas that display icons to select properties to display and modify currently assigned configurations for software components being developed by the software development system 100, and allows the software developer to modify configuration elements of the software component being developed.

The software development system 100 of one embodiment of the present invention is able to be used to develop software components that control or alter a configuration of computer workstations that execute the software component. The software component configuration window 200 contains sub-windows to display supporting data for the development and execution environment of the software component being developed. Entries in sub-windows are able to be expanded by, for example, double clicking on an item. The expansion of an item in this example results in displaying details of the selected item in another sub-window.

The software component configuration window 200 includes a global settings sub-window 202 that displays entries representing global settings for the computer workstations onto which developed and generated computer components will be deployed. A desktop management sub-window 204 displays configuration items for various profiles assigned to computer workstations. A registered actions sub-window 208 lists types of actions that have been defined and registered with, for example, action modules. A registered conditions group sub-window 210 includes a list of conditions that have been defined and registered with condition modules.

The desktop management sub-window 204 indicates that the "Drives" entry 220 has been selected. Selection of the "Drives" entry 220 in this example results in details about the "Drives" being displayed in the details window 206. The details window 206 of this example displays details for items that have been selected within the several sub-windows. Entries within some versions of the details window 206 are able to be selected by a software developer. In this illustrated example, the first entry 222 is further selected. Items within the software component configuration window are able to be selected through the conventional facilities of the graphical user interface 102, such as the mouse 144 and pointer 136.

A details information area 212 of this example allows an operator to examine, modify, and otherwise configure characteristics and other data associated with a selected item within the details window 206. The details of the item selected within the details window 206, i.e., the first entry 222, are shown in the details information area 212 in this example. The first entry 222, which is shown as a selected drives entry, is a representation of a collection of condition and action nodes. Through the graphical user interface facilities, such as the mouse 144 and keyboard 142, the configuration and various operating parameters of the selected entry are able to be modified by the software developer in the details information area 212.

Figure 3:
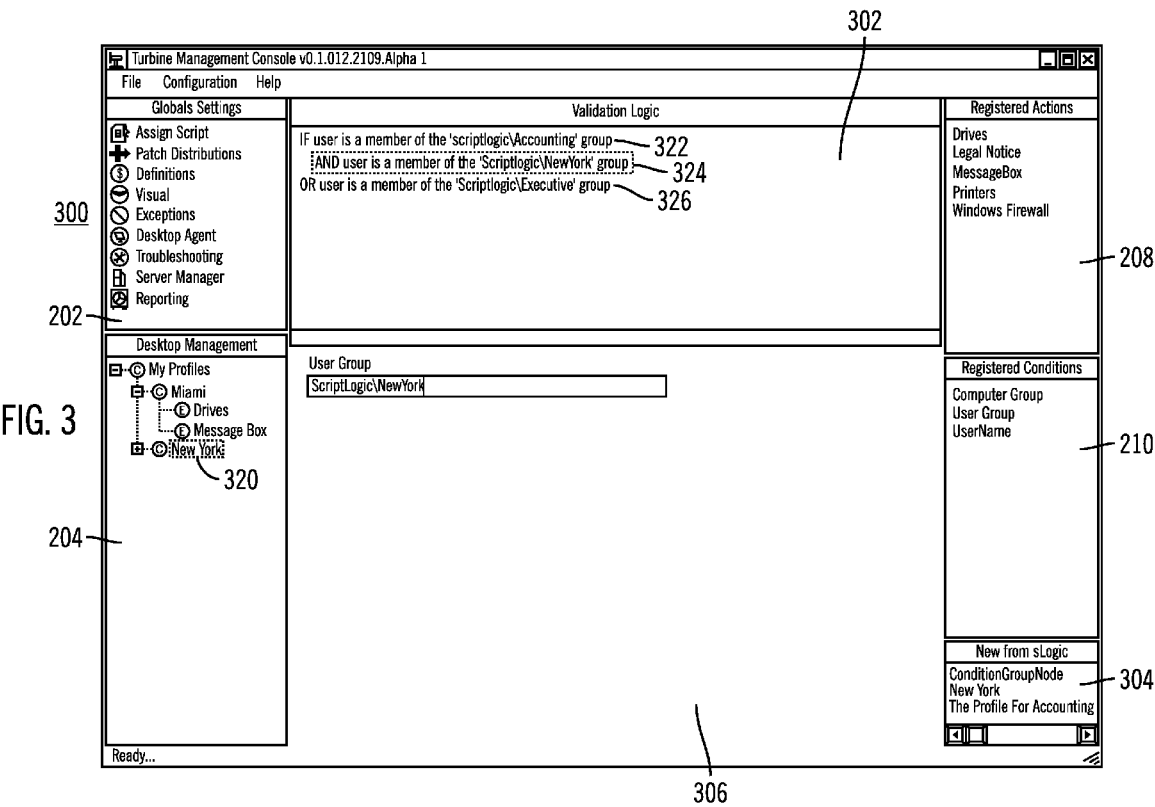
FIG. 3 illustrates a conditional group definition window able to be displayed on the graphical user interface illustrated in FIG. 1, in accordance with an exemplary embodiment of the present invention.

FIG. 3 illustrates a conditional group definition window 300 able to be displayed on the graphical user interface 102 illustrated in FIG. 1, in accordance with an exemplary embodiment of the present invention. The conditional group definition window 300 includes the global settings sub-window 202, the desktop management sub-window 204, the registered actions sub-window 208 and the registered conditions sub-window 210. The conditional group definition window 300 shows that the "New York" element 320 of the desktop management sub-window 204 is selected. This selection causes the details of the "New York" element 320 to be displayed in the validation logic window 302, which is equivalent to the details information window 206 described above. The validation logic window 302 illustrates the logical conditions that are required to be valid in order for the conditional module associated with the "New York" element to be satisfied and allow processing of the software component hierarchy to proceed beyond this conditional module. The entries in the validation logic window 302 are representations of condition nodes. Each line in the validation logic window 302 represents a node in a condition group that is processes before the child nodes, such as the selected nodes in the global settings sub-window 202, are executed. Details of the selected element are shown in the conditional module detail block 306.

A further sub-window, the "New from sLogic" sub-window 304 is shown in this example to list several elements that represent software modules that are able to be, for example associated with action, condition, and/or event nodes. Elements in the "New from sLogic" sub-window 304 are able to be provided by entities separate from the user and downloaded to the user's machine.

The conditional validation logic defined for the "New York" entry 320 of the "My Profiles" group illustrated in the desktop management sub-window 204 consists of three tests. A first statement 322 specifies a test to determine "IF user is a member of the 'scriptlogic\Accounting' group," a second statement 324 specifies a test "AND user is a member of the 'ScripLogic\NewYork' group," and a third statement 326 specifies a test "OR user is a member of the 'ScripLogic\Executive group." The second statement 324 is indented from the first statement 322 to indicate that the second statement 324 is to be evaluated along with the first statement 322. The third statement 326 is not indented relative to the first statement 322, and therefore indicates that the third statement 326 is to be evaluated in conjunction with the combination of the first statement 322 and the second statement 324. In this example, the second statement 324 is prefaced by an "AND" operator, requiring that the first statement 322 and the second statement 324 are required to both be true in order for the combination of the first statement 322 and the second statement 324 to be evaluated as true. After the combination of the first statement 322 and the second statement 324 are evaluated, the logical "OR" of that combination and of the evaluation of the third statement 326 is determined to evaluate the combined validation logic for the "New York" entry 320.

Figure 4:
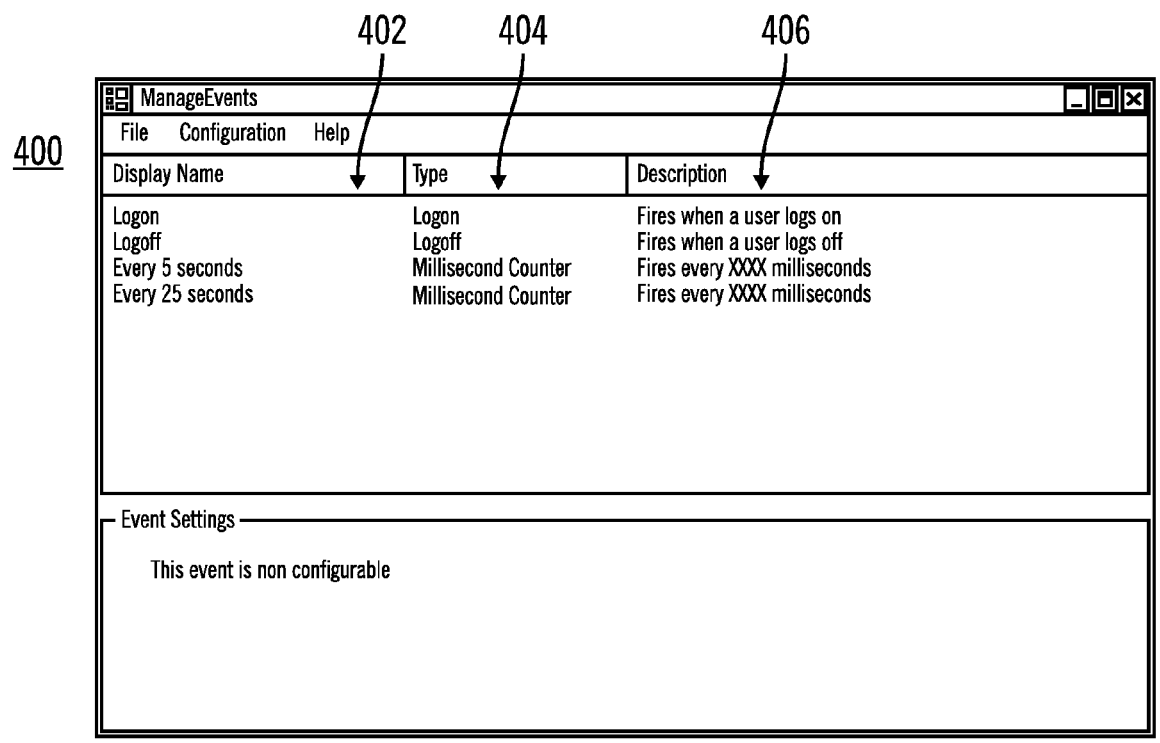
FIG. 4 illustrates an event list management window able to be displayed on the graphical user interface illustrated in FIG. 1, in accordance with an exemplary embodiment of the present invention.

FIG. 4 illustrates an event list management window 400 able to be displayed on the graphical user interface 102 illustrated in FIG. 1, in accordance with an exemplary embodiment of the present invention. The event list management window 400 lists events that occur externally to the software component being developed but that are able to be assigned to event modules within the software component developed through the software development system 100 and used to selectively trigger processing of selected portions of the developed software component. These events are external to the software component in that they are generated by processing or hardware devices that are not part of the software component developed by the software development system 100, although they are part of the computer system executing the software component.

The event list management window 400 has one row for each external event that is able to be processed by software components developed by the software development system 100. The event list management window 400 includes a "display name" column 402 that lists a human recognizable name for each external event. An "event type" column lists the type of event for each event. A more detailed description of the event is listed in a "description" column 406 in this example. The sample of events listed in this example include a "Logon" event, which corresponds to a user's logging on to the particular computer workstation executing the software component, a "Logoff" event which corresponds to a user's logging off of the particular computer workstation executing the software component, and events that trigger each 5 seconds and 25 seconds. Event modules are able to be defined and associated with each of these events, and the processing flow of a software component containing those event modules will be controlled, in part, by the occurrence of those events.

Figure 5:
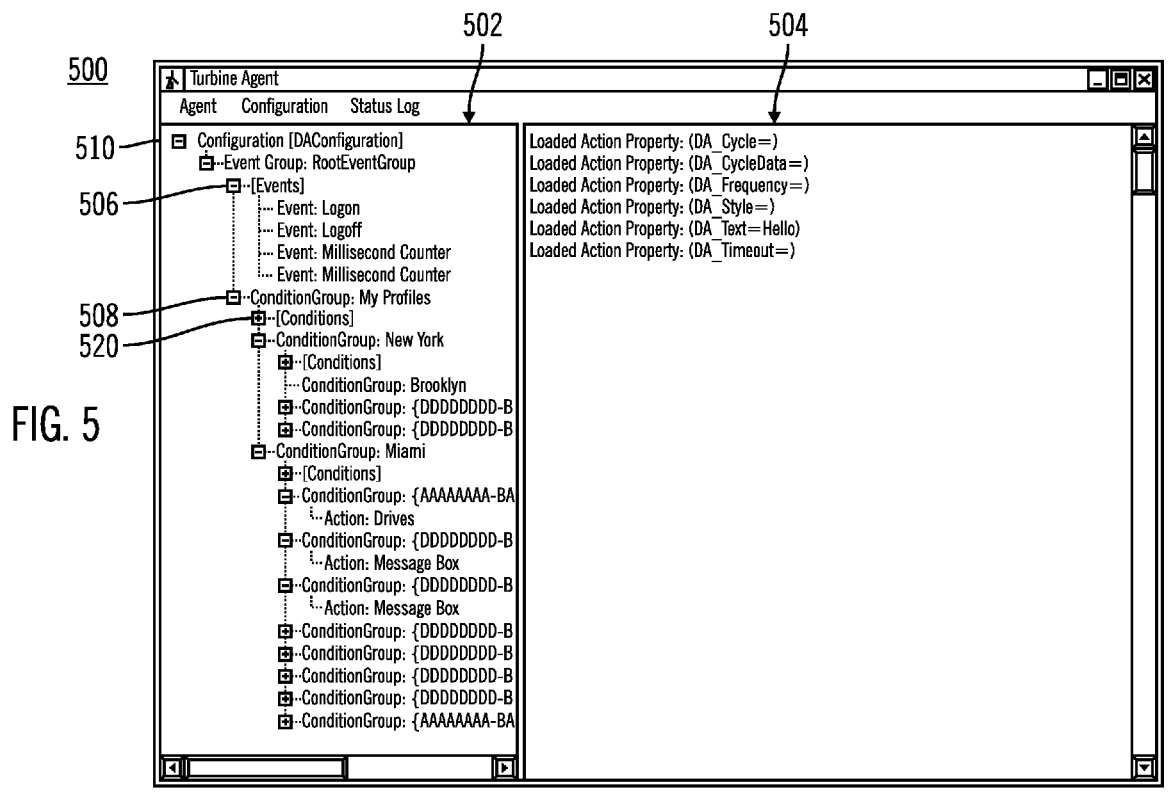
FIG. 5 illustrates a software component configuration display window able to be displayed on the graphical user interface illustrated in FIG. 1, in accordance with an exemplary embodiment of the present invention.

FIG. 5 illustrates a software component configuration display window 500 able to be displayed on the graphical user interface 102 illustrated in FIG. 1, in accordance with an exemplary embodiment of the present invention. The software component configuration display window 500 includes a component module window 502 that shows, as an example, a top level software component identifier 510 and several sub-trees for the different types of modules contained within the top level software component. An events sub-tree 506 lists the events that were described above in relation to the event list management window 400. A condition group sub-tree 508 lists condition group modules that are contained within the top level software component. The component module window 502 illustrates nodes that have names enclosed in square brackets to represent the internal nodes of each node. For example, the "[Conditions]" node 520 represents a separate branch of conditions for the parent of the node with names in brackets, e.g., the "Q2? Q3?" condition node 120 described above. Also, the "[Events]" node 506 contains the separate branch of events for its parent event node. The representation provided by the component module window 502 of this embodiment of the present invention eases browsing through the module hierarchy without separate pop-up trees. The software component configuration display window 500 includes a log window 504 that represents a log of the processing output of the modules as they are processed in the agent.

Figure 6:
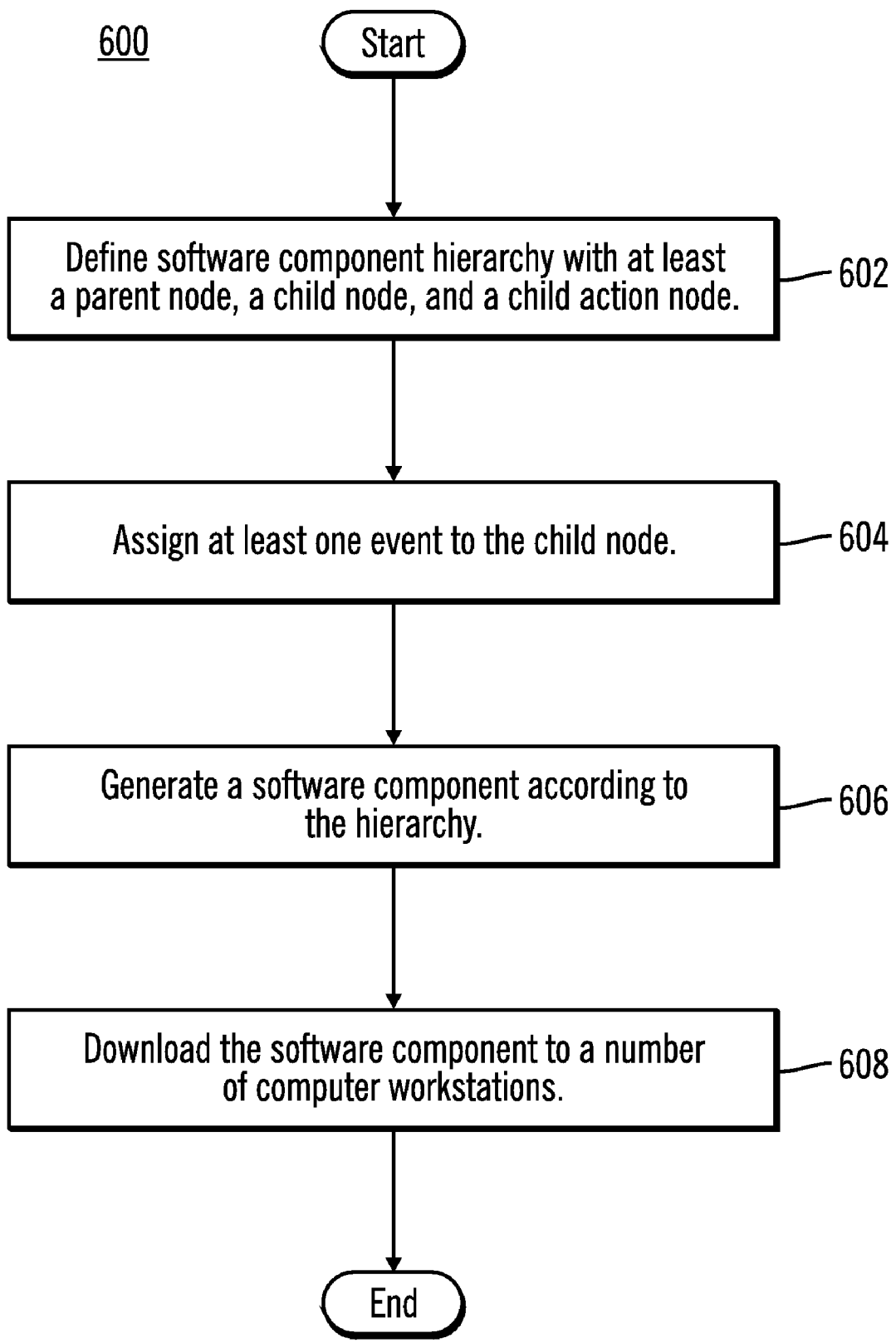
FIG. 6 illustrates a software component development and deployment processing flow diagram in accordance with an exemplary embodiment of the present invention.

FIG. 6 illustrates a processing flow diagram illustrating a software component development and deployment processing 600 in accordance with an exemplary embodiment of the present invention. The software component development and deployment processing 600 begins by defining, at step 602, a software component hierarchy. An example software component hierarchy 104 is described above. An example software component hierarchy includes at least a parent module, a child module, and at least one child action module. After the software component hierarchy is defined, the processing continues by assigning, at step 604, at least one event to the child module. In the above example, an event is able to be assigned to an event module, such as the E1 module 112 or the E2 module 122. It is to be understood that the graphical user interface 102 described above allows flexibility in the ordering of the definition of the software component hierarchy 104 and assignment of events to action modules. Once a software component hierarchy is at least partially defined, events are able to be assigned to event modules and further additions and/or modification are able to be made to the software component hierarchy 104.

After assigning at least one event to event nodes within the software component hierarchy, the processing generates, at step 606, a software component according to the hierarchy. In one embodiment of the present invention, the software component is a Microsoft .NET application and consists of a number of components that are able to be independently created, maintained and distributed to computer workstations. The processing then downloads, at step 608, the generated software component to one or more computer workstations. The software component development and deployment processing 600 then terminates.

Figure 7:
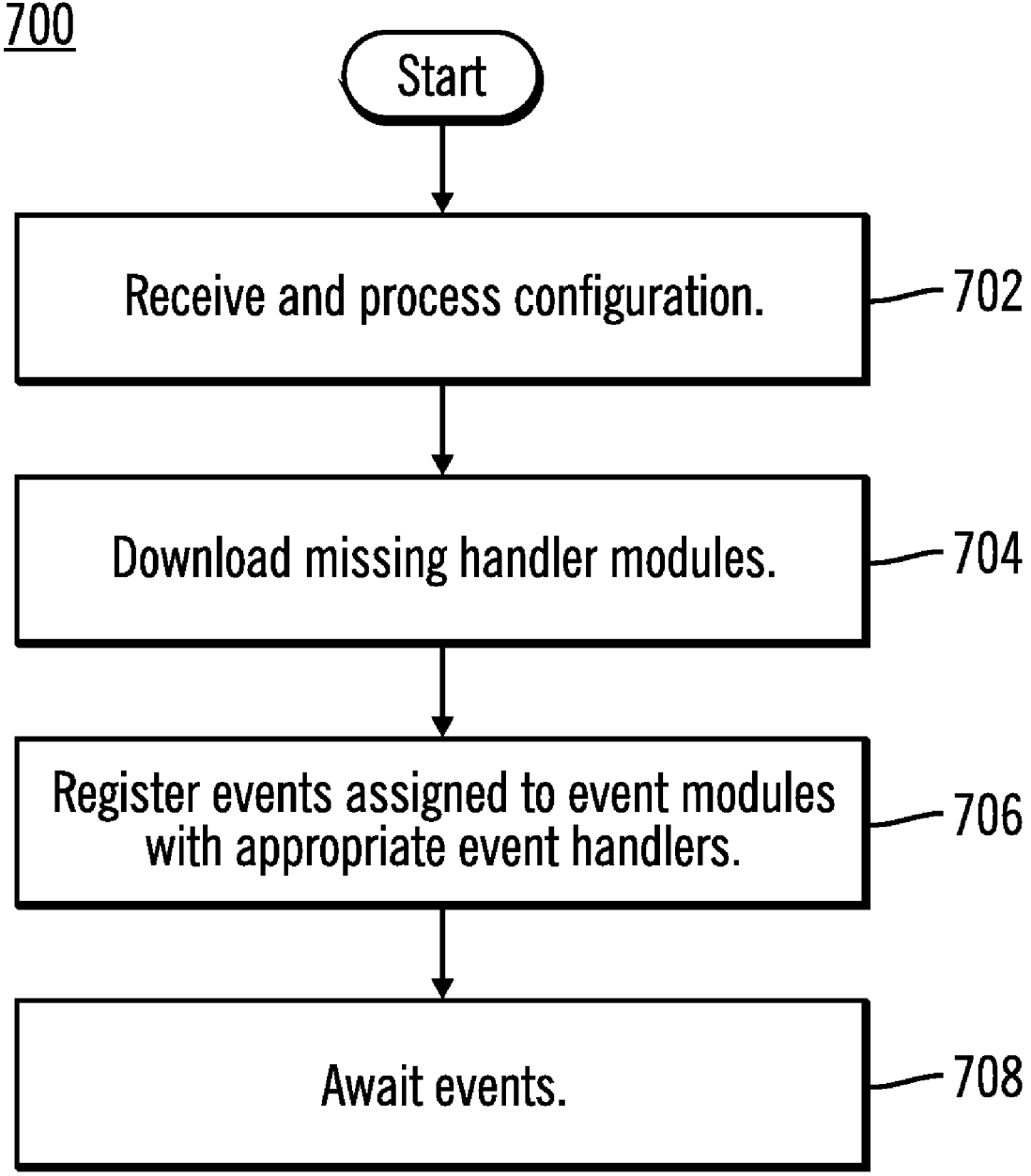
FIG. 7 illustrates a software component initial processing flow diagram in accordance with an exemplary embodiment of the present invention.

FIG. 7 illustrates a processing flow diagram for a software component initial processing flow 700 in accordance with an exemplary embodiment of the present invention. The software component initial processing flow 700 begins by receiving and processing, at step 702, a software component configuration for the software component being installed and/or executed on the particular computer workstation. In processing the software component configuration, handler components that are not currently present on the particular workstation are identified as being required to be downloaded from a software server. The processing continues by downloading, at step 704, the missing handler components. The processing continues by registering, at step 706, events that are assigned to event modules within the software component with the appropriate event handlers. The processing of the computer workstation proceeds to awaiting, at step 708, events. The processing of this embodiment is then suspended until an event occurs and triggers processing of an appropriate event module within the software component.

Figure 8:
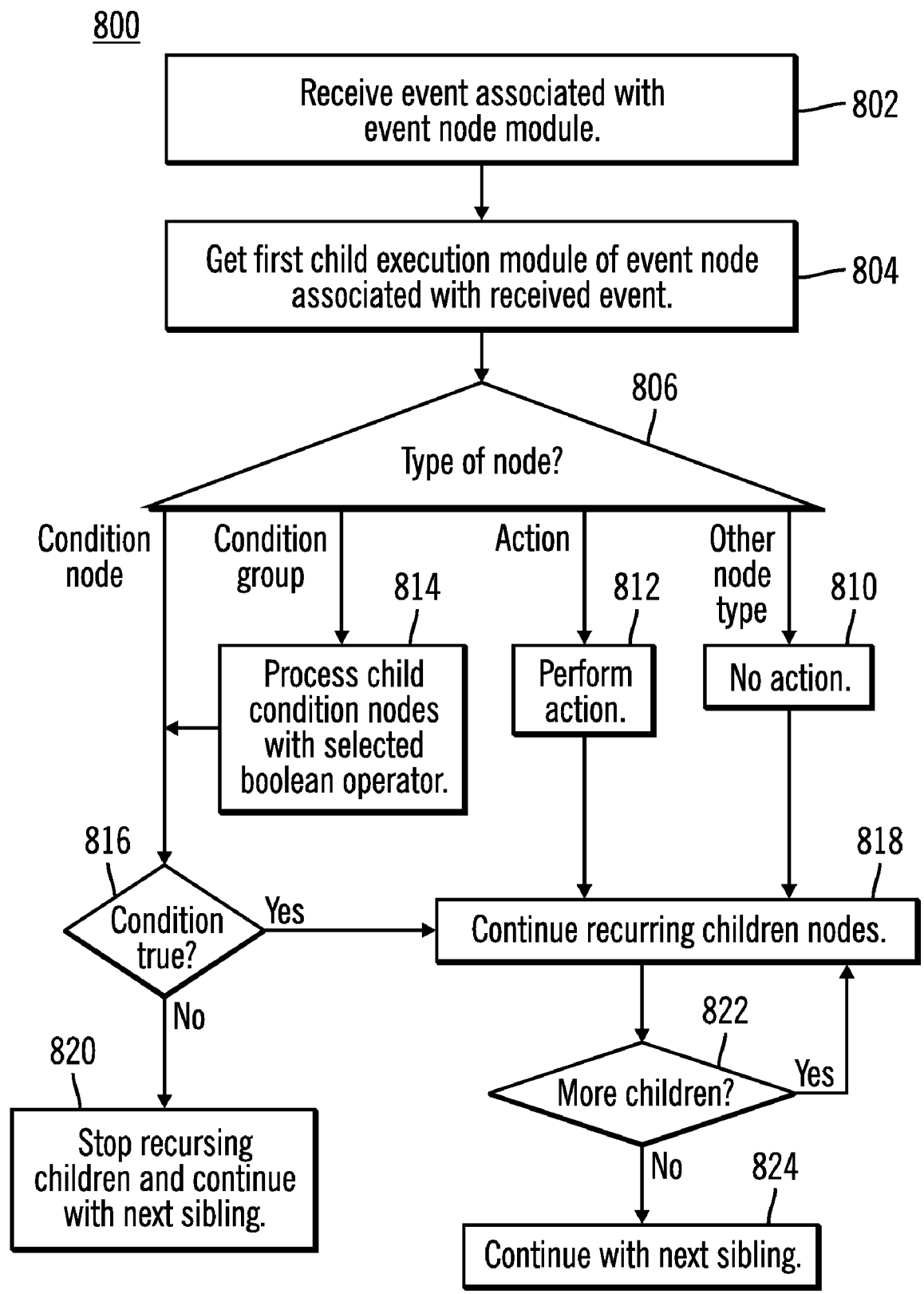
FIG. 8 illustrates a software component run-time processing flow diagram in accordance with an exemplary embodiment of the present invention.

FIG. 8 illustrates a processing flow diagram of a software component run-time processing flow 800 in accordance with an exemplary embodiment of the present invention. The software component run-time processing flow 800 of this example is triggered by an event that occurs during the await event step 708, described above. The software component run-time processing flow 800 begins by receipt, at step 802, of an event associated with an event node component. The processing proceeds by getting, at step 804, the first child execution module of the event node that is associated with the received event. The processing then determines, at step 806, the type of node of the just retrieved child execution component. If the node is a condition node, processing continues by determining, at step 816, if the condition specified by the condition is true. If that condition is not true, the processing stops, at step 820, recurring children along that hierarchical branch and continues by processing the next sibling hierarchical branch, if there is one present.

If the condition is determined, at step 816, to be true, the processing continues, at step 818, recurring children nodes. The processing then determines, at step 822, if there are more children nodes. If there are more children nodes, the processing returns to recurring, at step 816, children nodes. If there are no more children nodes, the processing continues, at step 824, with the next sibling hierarchical branch of the software component.

If the type of node is determined, at step 806, to be a condition group node, the processing continues by processing, at step 814, the child condition nodes with the selected Boolean operator that is specified within that conditional group node. This results in the processing determining the logical value of a combination of test statements, such as described above with respect to "New York" element 320. The processing then proceeds to determine, at step 816, if the combined condition is true. The processing then continues after step 816 as described above.

If the type of node is determined, at step 806, to be an action node, the processing performs, at step 812, the action defined for that node. The processing then continues, at step 818, by recurring children nodes and performs the subsequent processing described above.

If the type of node is determined, at step 806, to be another type of node, the processing performs, at step 810, no action for that node. Examples of other nodes are other event nodes for which no actions are associated but which are able to initiate processing of their children nodes if their associated event triggers. The processing then continues, at step 818, by recurring children nodes and performs the subsequent processing described above.

Exemplary Automated Data Processing System

Figure 9:
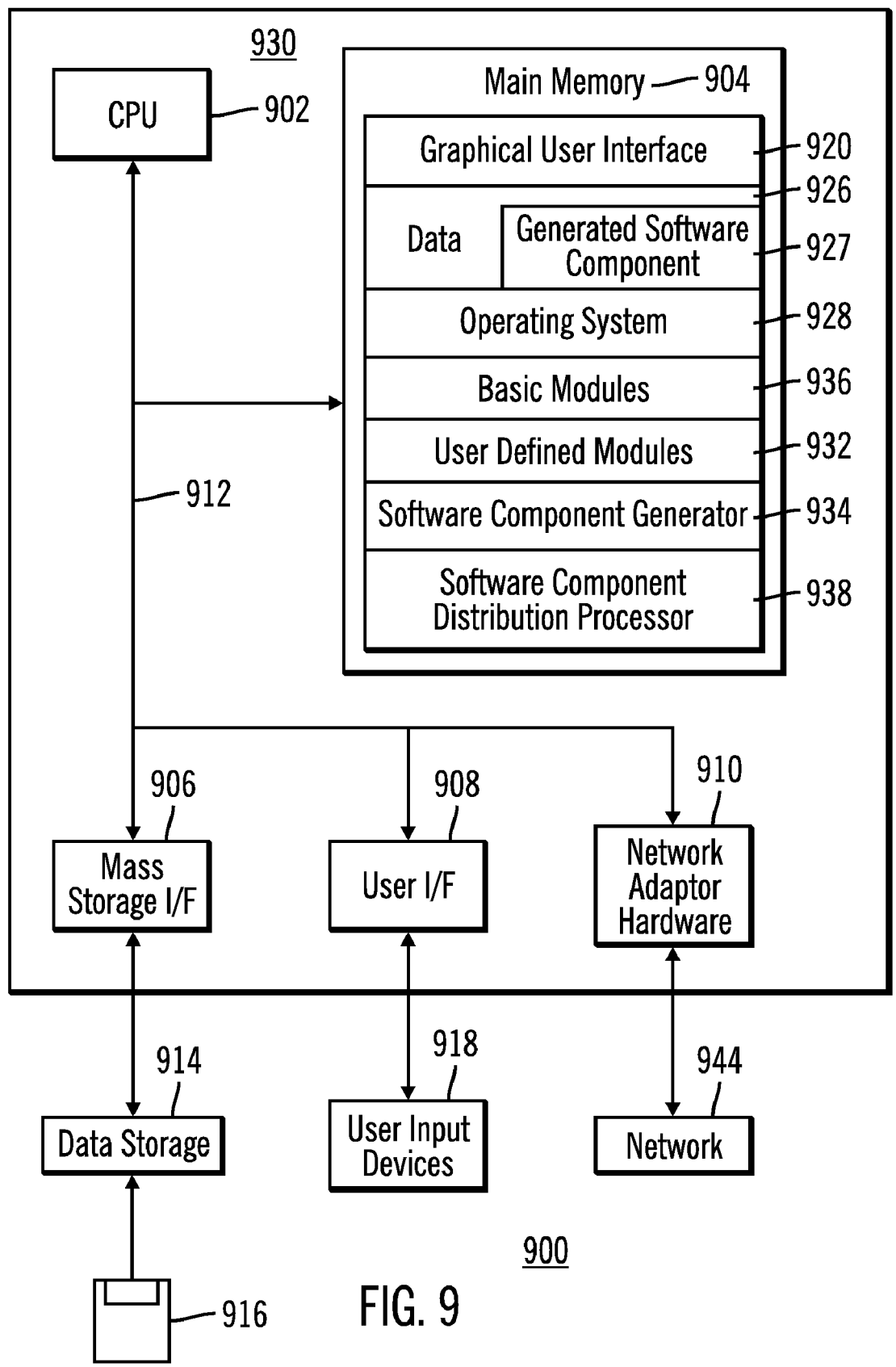
FIG. 9 illustrates a block diagram depicting an automated data processing system according to an exemplary embodiment of the present invention.

FIG. 9 illustrates a block diagram depicting an automated data processing system 900, such as the software development system 100, according to one embodiment of the present invention. The automated data processing system 900 is based upon a suitably configured processing system adapted to implement the exemplary embodiment of the present invention. Any suitably configured processing system is similarly able to be used as an automated data processing system 900 by embodiments of the present invention. The automated data processing system 900 includes a computer 930. Computer 930 has a processor 902 that is connected to a main memory 904, mass storage interface 906, user interface 908 and network adapter hardware 910. A system bus 912 interconnects these system components. Mass storage interface 906 is used to connect mass storage devices, such as data storage device 914, to the computer system 900. One specific type of data storage device is a floppy disk drive, which may be used to store data to and read data from a floppy diskette 916, which contains a signal bearing medium. Another type of data storage device is a data storage device configured to support fixed disk drives and/or various types of removable storage media.

Main Memory 904 contains a graphical user interface software program 920, data 926, an operating system image 928, basic software modules 936, user defined software modules 932, a software component generator 934, and a software component distribution processor 938. Although illustrated as concurrently resident in main memory 904, it is clear that these data elements are not required to be completely resident in the main memory 904 at all times or even at the same time. The automated data processing system 900 utilizes conventional virtual addressing mechanisms to allow programs to behave as if they have access to a large, single storage entity, referred to herein as a computer system memory, instead of access to multiple, smaller storage entities such as main memory 904 and data storage device 914. Note that the term "computer system memory" is used herein to generically refer to the entire virtual memory of automated data processing system 900.

Although only one CPU 902 is illustrated for computer 930, computer systems with multiple CPUs can be used equally effectively. Embodiments of the present invention further incorporate interfaces that each includes separate, fully programmed microprocessors that are used to off-load processing from the CPU 902. User interface 908 is used to directly connect one or more user input device 918 to computer 903 to provide a user interface to accept user inputs. The user input devices 918 are able to include 918, for example, keyboard 142, mouse 144 and monitor 140.

The data 926 stored within main memory 904 includes storage for a generated software component 927. The generated software component 927 of one embodiment of the present invention corresponds to the software component hierarchy 104 as is described above.

Operating system 928 is a suitable multitasking operating system such as the Windows XP or Windows Server 2003 operating system. Embodiments of the present invention are able to use any other suitable operating system. Some embodiments of the present invention utilize architectures, such as an object oriented framework mechanism, that allows instructions of the modules of operating system 928 to be executed on any processor located within automated data processing system 900. The operating system 928 of the exemplary embodiment includes Microsoft .NET framework modules to support execution of software that conforms to the .NET standard, such as the generated software component 927 of one embodiment of the present invention.

The basic software modules 936 include definition of the above described basic software modules that are available to a software component developer in creating a software component 927. The basic software modules 936 of one embodiment of the present invention include event modules, condition modules, action modules and combination modules. The user defined modules 932 stores definitions of software modules that a software component developer defines and are made up of combinations of basic modules and/or other user defined modules.

The software component generator 934 is a software program that processes a software component hierarchy to define the corresponding combination of software modules that are required to make up the software component 927 and then creates the software component 927 in preparation for distribution to one or more computer workstations.

The software component distribution processor 938 is a software program that controls distribution of generated software component 927 to one or more computer workstations. The generated software component 927 of one embodiment of the present invention is designed to control computer workstations or alter a configuration of computer workstations. After the software component 927 is designed by the software development system 100, a system manager is able to define one or more computer workstations which are to receive the generated software component 927.

Network adapter hardware 910 is used to provide an interface to the network 944. Embodiments of the present invention are able to be adapted to work with any data communications connections including present day analog and/or digital techniques or via a future networking mechanism. The network 944 of one embodiment of the present invention is used to distribute the software component 927 to one or more computer workstations that are also connected to this communications network 944.

Although the exemplary embodiments of the present invention are described in the context of a fully functional computer system, those skilled in the art will appreciate that embodiments are capable of being distributed as a program product via floppy disk, e.g. floppy disk 916, CD ROM, or other form of recordable media, or via any type of electronic transmission mechanism.

Non-Limiting Software and Hardware Examples

Embodiments of the invention can be implemented as a program product for use with a computer system such as, for example, the computing environment shown in FIG. 9 and described above. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, component, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, components, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A computer implemented method for developing a modular software component, the method comprising:
    using a processor to perform the following:
    providing a graphical user interface adapted to accept operator inputs;
    defining, through the graphical user interface, a hierarchical representation for at least one software component, the hierarchical representation comprising:
        an event node able to be associated with a selected external event such that child nodes of the event nodes execute in response to an occurrence of the selected external event;
        at least one action node arranged as a child node to the event node within the hierarchical representation, the at least one action node having a respective associated child software action module; and
        a parent node arranged as a parent node to the event node within the hierarchical representation, the parent node having an associated parent software action module,
        the hierarchical representation indicating that the respective associated child software action module executes:
            in the absence of an occurrence of the selected external event associated with the event node and
            in response to completion of execution of the complete parent software action module associated with the parent node, and
        the respective associated child action module executes in response to an occurrence of the selected external event associated with the event node in the absence of execution the parent software module;
    accepting an input through the graphical user interface, the input identifying the selected event external to the software component and the input also identifying the selected software component within the at least one software component;
    associating, in response to the accepting through the graphical user interface, the event node with the selected external event external to the software component; and
    creating a software package comprising the child software action module and the parent software action module as defined by the hierarchical representation,
    the child software action module is executes independently of execution of the parent software action module and in response to the selected external event and
    the child software action module executes upon completion of execution of the complete parent software action module.

2. The computer implemented method according to claim 1, further comprising distributing the software package to a plurality of computer workstations for execution on each computer workstation within the plurality of computer workstations.

3. The computer implemented method according to claim 1, wherein the software package comprising the child software action module and the parent software action module as defined by the hierarchical representation is for altering a configuration of a computer workstation.

4. The computer implemented method according to claim 1, wherein the hierarchical representation comprises a plurality of nodes, each node in the plurality of nodes being selected, through the graphical user interface, from a set of pre-defined nodes comprising all of:
    an event node being associated, through the graphical user interface, with the selected external event,
    an action node being associated, through the graphical user interface, with an executable software module,
    a condition node defining, through the graphical user interface, at least one conditional to be satisfied in order to execute child action modules, and
    a combination module defined, through the graphical user interface, as a combination of a plurality of the event modules, the action modules and the condition modules, and
    wherein the child software node is selected from at least one of the event node and the combination node.

5. The computer implemented method according to claim 1, wherein the software package is for controlling a computer workstation.

6. A non-transitory machine readable medium tangibly encoded with computer software component, the computer software component comprising:
    a hierarchical representation comprising:
        an event node able to be associated with a selected external event such that child nodes of the event nodes execute in response to an occurrence of the selected external event;
        at least one action node arranged as a child node to the event node within the hierarchical representation, the at least one action node having a respective associated child software action module; and
        a parent node arranged as a parent node to the event node within the hierarchical representation, the parent node having an associated parent software action module,
        the hierarchical representation indicating that the respective associated child software action module executes:
            in the absence of an occurrence of the selected external event associated with the event node and
            in response to completion of execution of the complete parent software action module associated with the parent node, and
        the respective associated child action module executes in response to an occurrence of the selected external event associated with the event node in the absence of execution of the parent software module;

the event node being associated with a selected external event external to the software component; and at least one child software action module, wherein the child software action module is a child of the parent software action module as defined by the hierarchical representation, wherein of the child software action module executes independently of execution of the parent software action module and in response to the selected external event and the child software action module executes upon completion of execution of the complete parent software action module.

7. The computer software component according to claim 6, wherein the hierarchical representation comprises a plurality of nodes, each node in the plurality of nodes being selected, through the graphical user interface, from a set of pre-defined nodes comprising all of:

an event node being associated, through the graphical user interface, with the selected external event, an action node being associated, through the graphical user interface, with an executable software module, a condition node defining, through the graphical user interface, at least one conditional to be satisfied in order to execute child action modules, and a combination module defined, through the graphical user interface, as a combination of a plurality of the event modules, the action modules and the condition modules, and wherein the child software node is selected from at least one of the event node and the combination node.

8. A software development system adapted to developing a modular software component, the software development system comprising:

a graphical user interface adapted to:

accepting operator inputs;

defining a hierarchical representation for at least one software component, the hierarchical representation comprising:

an event node able to be associated with a selected external event such that child nodes of the event nodes execute in response to an occurrence of the selected external event;

at least one action node arranged as a child execution node to the event node within the hierarchical representation, the at least one action node having a respective associated child software action module; and a parent node arranged as a parent node to the event node within the hierarchical representation, the parent node having an associated parent software action module, the hierarchical representation indicating that the respective associated child software action module executes:

in the absence of an occurrence of the selected external event associated with the event node and in response to completion of execution of the complete parent software action module associated with the parent node, and the respective associated child action module executes in response to an occurrence of the selected external event associated with the event node in the absence of execution of the parent software module; and accepting an input through the graphical user interface, the input identifying the selected event external to the software component and the input also identifying the selected software component within the at least one software component;

an event manager adapted to associating, through the graphical user interface and in response to the accepting, the event node with the selected external event external to the software component; and a software component generator adapted to creating a software package comprising the child software action module and the parent software action module as defined by the hierarchical representation, the child software action module executes independently of execution of the parent software action module and in response to the selected external event and the child software action module executes upon completion of execution of the complete parent software action module.

9. The software development system according to claim 8, further comprising a software distribution processor adapted to distributing the software package to a plurality of computer workstations for execution on each computer workstation within the plurality of computer workstations.

10. The software development system according to claim 8, wherein the software component generator is further adapted to adapting the software package comprising the child software action module and the parent software action module as defined by the hierarchical representation for altering a configuration of a computer workstation.

11. The software development system according to claim 8, wherein the hierarchical representation comprises a plurality of nodes, each node in the plurality of nodes being selected, through the graphical user interface, from a set of pre-defined nodes comprising all of:

an event node being associated, through the graphical user interface, with the selected external event, an action node being associated, through the graphical user interface, with an executable software module, a condition node defining, through the graphical user interface, at least one conditional to be satisfied in order to execute child action modules, and a combination module defined, through the graphical user interface, as a combination of a plurality of the event modules, the action modules and the condition modules, and wherein the child software node is selected from at least one of the event node and the combination node.

12. A non-transitory machine readable medium tangibly encoded with a machine executable program, the machine executable program comprising instructions for:

providing a graphical user interface adapted to accept operator inputs;

defining, through the graphical user interface, a hierarchical representation for at least one software component, the hierarchical representation comprising:

an event node able to be associated with a selected external event such that child nodes of the event nodes execute in response to an occurrence of the selected external event;

at least one action node arranged as a child node to the event node within the hierarchical representation, the at least one action node having a respective associated child software action module; and a parent node arranged as a parent node to the event node within the hierarchical representation, the parent node having an associated parent software action module, the hierarchical representation indicating that the respective associated child software action module executes:
   in the absence of an occurrence of the selected external event associated with the event node and
   in response to completion of execution of the complete parent software action module associated with the parent node, and
the respective associated child action module executes in response to an occurrence of the selected external event associated with the event node in the absence of execution the parent software module;
accepting an input through the graphical user interface, the input identifying the selected event external to the software component and the input also identifying the selected software component within the at least one software component;
associating, in response to the accepting through the graphical user interface, the event node with the selected external event external to the software component; and
creating a software package comprising the child software action module and the parent software action module as defined by the hierarchical representation,
the child software action module executes independently of execution of the parent software action module and in response to the selected external event and
the child software action module executes upon completion of execution of the complete parent software action module.

13. The machine readable medium according to claim 12, the machine executable program further comprising instructions for distributing the software package to a plurality of computer workstations for execution on each computer workstation within the plurality of computer workstations.

14. The machine readable medium according to claim 12, wherein the software package comprising the child software action module and the parent software action module as defined by the hierarchical representation is for altering a configuration of a computer workstation.

15. The machine readable medium according to claim 12, wherein the hierarchical representation comprises a plurality of nodes, each node in the plurality of nodes being selected, through the graphical user interface, from a set of pre-defined nodes comprising all of:
   an event node being associated, through the graphical user interface, with the selected external event,
   an action node being associated, through the graphical user interface, with an executable software module,
   a condition node defining, through the graphical user interface, at least one conditional to be satisfied in order to execute child action modules, and
   a combination module defined, through the graphical user interface, as a combination of a plurality of the event modules, the action modules and the condition modules, and
wherein the child software node is selected from at least one of the event node and the combination node.

* * * * *

UNITED STATES PATENT AND TRADEMARK OFFICE
CERTIFICATE OF CORRECTION

PATENT NO.      : 7,814,460 B2
APPLICATION NO. : 11/457228
DATED           : October 12, 2010
INVENTOR(S)     : Charles B. Bucklew et al.

It is certified that error appears in the above-identified patent and that said Letters Patent is hereby corrected as shown below:

IN THE CLAIMS:

Claim 1, Col. 13, l. 59 please insert --of-- after execution

Claim 1, Col. 14, l. 4 please delete "is" after module

Claim 6, Col. 15, l. 7 please delete "of" after wherein

Claim 8, Col. 15, l. 45 please delete "execution" after child

Signed and Sealed this

Twenty-first Day of December, 2010

David J. Kappos
*Director of the United States Patent and Trademark Office*